3,214,379
METHOD OF PREPARING IMPROVED MAGNETIC MATERIAL OF CONTROLLED PARTICLE SIZE
Robert H. Lindquist, Berkeley, Calif., assignor to California Research Corporation, San Francisco, Calif., a corporation of Delaware
Filed Sept. 28, 1962, Ser. No. 226,871
16 Claims. (Cl. 252—62.5)

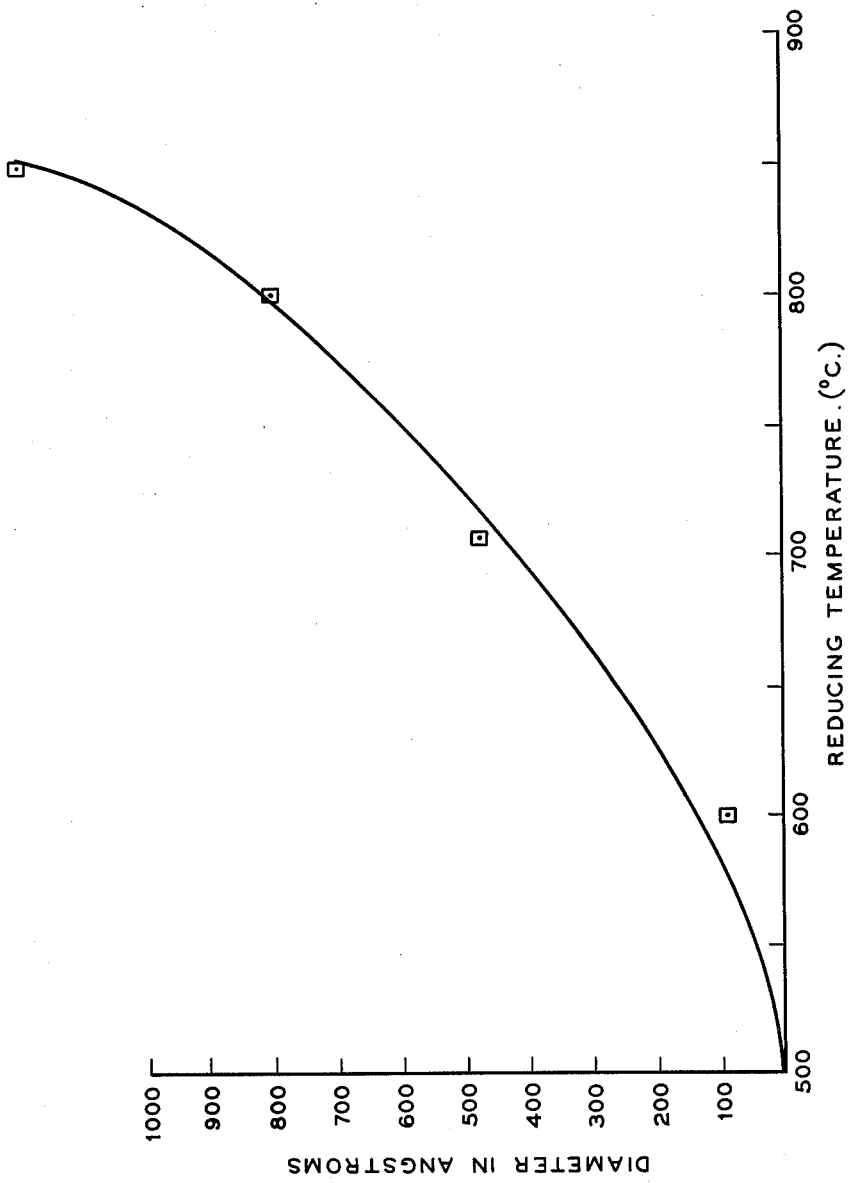

This application is a continuation-in-part of my copending application, Serial No. 101,005 filed April 5, 1961, now abandoned, which in turn is a continuation-in-part of Serial No. 30,373 filed May 19, 1960, now Patent No. 3,140,925.

The present invention is directed to a method of preparing magnetic material of controlled particle size. Also, the invention concerns new and improved magnetic core materials supported on a magnetically inert base. Further, the invention pertains to improved magnetic storage and logic elements.

Particle size, as well as the form of the crystals of magnetic materials is important in obtaining the desired characteristics in magnets for various uses. Thus, when the particles of magnetic material are made in accordance with this invention with an average dimension of up to about 100 A., the resulting product is magnetically "soft." Such product has a low coercive force ($H_c$) and remanence ($B_r$) and is useful in making various types of inductors useful at high frequency, cores for high frequency transformers, magnetic elements suitable for use in the logic and memory units of digital computers and for other uses where low eddy current and hysteresis loses and high frequency responses are desirable.

When particles of 100 A. to about 750 A. are obtained in accordance with this invention, the particles are magnectically "hard" and have a high coercive force and remanence. Such particles, when formed into proper shapes, are useful for permanent magnets in applications such as door latches, mechanical couplings, television yokes, and memory devices, e.g., magnetic tapes, drums and discs.

The particles prepared in accordance with this invention essentially all have only one magnetic domain; that is, the magnetic spins of all atoms in such single domain particles are pointing in the same direction. When magnetically "hard" particles have the characteristic of single domains, a much stronger magnetic field is required to change their magnetic vector direction, this being the property desirable in so-called permanent magnets.

Briefly, the method of obtaining particles having the magnetic properties referred to above comprises the steps of contacting a metal oxide composition containing at least relatively high surface area alumina or magnesia in a substantially dehydrated state with an aqueous solution of at least one fluoride of a transition group metal for a sufficient period of time and with sufficient metal fluoride present to chemisorb on said metal oxide at least 5% by weight calculated as transition group metal based upon the metal oxides. The step of contacting the alumina- or magnesia-containing material with the aqueous solution of metal fluoride is believed to involve a chemisorption phenomenon. The reaction between the metal fluoride and the substantially dehydrated base forms metal oxy-compounds (involving oxygen and/or hydroxyl bridges with the base material).

After such contacting, the excess aqueous solution is removed, separated from the metal fluoride-treated alumina or magnesia. The remaining material is then treated to obtain a dried product having the added transitional group metal in reduced form. The treatment includes careful drying and reduction of the metal oxy-compounds formed in the chemisorption to reduced metal.

Usually, the base material after contact with the aqueous metal fluoride solution is first dried at relatively low temperatures (i.e., below about 250° C.) and then heated in a reducing atmosphere at temperatures and times to reduce the oxy-compounds of the extremely finely dispersed chemisorbed transition group metal with controlled sintering to magnetic particles having sizes below about 750 A. Instead of separately drying in air and then reducing the fluoride-treated base material, the drying can be done under a reducing atmosphere with the reducing gas sweeping the water vapor out. Thereafter, the added metal in the dried material is reduced to the metal by raising the temperature while still maintaining the reducing atmosphere. Either way, the temperature of drying is kept low (i.e., below 250° C.), at least until substantially all (e.g., about 95% or more) of the water is removed. The heating step is carried out in a reducing atmosphere such as hydrogen which is conducive to converting any oxy-compounds of the transition metal to the reduced metal. The reduction produces free metal particles which would remain at substantially monoatomic dimensions except for the sintering that accompanies the reduction. The temperature for reducing and partially sintering to the desired extent is generally above about 350° C. but below the temperature at which the reduced metal appreciably combines chemically with the metal oxide base, e.g., where the free metal reacts with the aluminum base to form a metal aluminate. This upper limit of temperature for cobalt is about 850° C. Below about 350° C. there is no appreciable reduction in reasonable periods of time. Where it is desired to have the added metal in magnetic particles of sizes up to about 100 A., the treatment is at conditions under which sintering of the reduced metal particles (which are substantially monoatomic when formed) is minimized, but not so completely absent to prevent magnetic particles to form. Generally, there should be enough sintering to give metal particles of at least 10 A. To obtain the magnetic particles in sizes from 100 to 750 A., the conditions of treatment are such as to induce an appreciable sintering. The metal particles sizes given herein refer to average dimensions; for spherical particles, this is the diameter, and for anisotropic particles, the size is one-third of the sum of the three particle dimensions.

The magnetic materials produced by this process have the metal particles uniformly dispersed on the surface of the alumina or magnesia base material, whereas metal particles formed by decomposition of salts impregnated on a support do not. Further, metal particles from impregnation are not of uniform size or sufficiently small to exhibit, collectively, single domain characteristics. The uniformity of spacing of the metal particles in the product of the present invention results from binding the chemisorbed metal oxy-compounds into a uniform pattern on the surface of the base material through the reaction of the metal fluoride with the surface hydroxyl groups which are uniformly spaced in the alumina or magnesia base material. Upon reduction of the chemisorbed compounds, which are substantially monoatomic in dimensions, the metal particles produced are uniformly spaced with the dielectric base material serving as a separating or isolating material. With the substantially dehydrated alumina or magnesia, i.e., containing 3–10% by weight of combined water and most of the hydroxyl groups reacted with the metal fluoride, the metal particles produced in the process have a uniform spacing of at least 20 A. apart, thereby avoiding the formation of local closed flux loops between particles. Since the base material is nonconductive and nonmagnetic, the spaced metal particles act as separate magnetic domains and when magnetically aligned during reduction and sintering, have a high remanence and rectangular hysteresis curve as desired for high switching speeds in magnetic switching elements. With the uniform spacing so attained, the effect of the magnetic field of each particle on its nearest neighboring particles is uniform, thereby avoiding the formation of different effective magnetic fields, which would result in slower switching times. Herein, switching times are defined as the time from the initial current drive pulse to where the voltage induced in the pickup line decreases to 10% of its maximum value. When high switching speeds are desired, the metal particles are large enough to have a relaxation time equal to or greater than the switching time pulse employed in the switching system; i.e., the monoatomic particles as formed in the reduction are sintered into particles having the desired relaxation time. For cobalt and a timing pulse repetition rate of 1 mc./sec., the preferred minimum size is 80 A. at room temperature; switching elements composed of particles below such size will not hold their magnetization for the usually desired minimum of 10 microseconds. Hence, the size of the metal particles in the magnetic elements for use as switching elements are just above that transition point at which their character changes from superparamagnetic to ferromagnetic. Consistent with the foregoing, the metal particles are preferably as small as possible, that is, below about 150 A., especially below about 100 A., for minimum coercive force. For such preferred embodiment of the present invention, the particles are formed by reduction in a magnetic field for maximum alignment and shape anisotropy. A particular advantage of such uniformly spaced single domain magnetic particles for use in switching elements is that they are easily fabricated and the process variables in the preparation are readily controlled to emphasize the characteristics desired in the product.

With magnetic elements formed of such single domain metal particles, the elements are magnetized by domain rotation, rather than domain wall movement, and hence, require relatively small magnetic fields for rapidly switching from one stable state of remanent magnetization to the stable state. Such elements are referred to as low drive elements, having the attribute of reduced power consumption for switching. This attribute is coupled with that of a high degree of hysteresis loop rectangularity which insures maximum discrimination between the stable state with low drive. As used herein, the term "magnetic element" includes magnetic core, toroid, disc, body and the like, which all refer to a mass of magnetic material.

Generally, the method comprises reacting a compound of ferromagnetic metal with a solid electrically nonconductive and nonmagnetic base material having a high surface area and uniformly spaced reactive sites on said surface to form a reducible new metal compound at the reactive sites. Then the new metal compound is reduced to form monoatomic metal particles uniformly spaced on the solid base material surface and sintering follows in a magnetic field to grow metal particles with their crystal axes uniformly aligned and exhibiting single domain magnetic properties.

The products, when formed in the proper physical shapes, are highly useful magnetic materials. For example, the present invention yields magnets of cobalt particles (Curie point of 1120° C.) which can be magnetically stable to relatively high temperatures. Protection against oxidation can be obtained by impervious coatings of plastic. Other uses and applications of the magnetic materials produced by the process of the present invention are described elsewhere in the specification. Generally, the magnetic materials of less than 100 A. size for the magnetic metal are superparamagnetic at room temperature and can be beneficially used where low coercive force and low remanence are desired. Preferably used where high remanence characteristics are desired are the compositions with metal particles having a size larger than the extremely small sizes associated with superparamagnetic properties. The minimum sizes depend upon the temperature and the nature of the metal in the particle, the critical transition sizes being indicated for some metals by F. E. Luborsky in J. of Applied Physics, 33, 1910 (1962). Generally, compositions of 100 to 750 A. particle size magnetic metal are useful in permanent magnets and other applications where high coercive force and high remanence characteristics are advantageous. The remanence can be further increased by reducing the compositions (usually as formed in shapes such as rods or pellets) in a magnetic field larger than the anisotropy field (1000 gauss for face centered cubic cobalt). The resulting aligned axes of the dispersed single domain particles act to make a high remanence and rectangular hysteresis cycle of the technical magnetization curve. Magnetic cores and the like made with such particles exhibit both a high remanent flux and a high rate of change in flux as the core switches between opposite polarity states of saturation. These properties make such cores particularly useful for magnetic switches, magnetic amplifiers, coincidence circuits and memory circuits for computers.

A particular advantage of the present process is that where magnetic alignment of the metal particles is desired, such alignment can be carried out after the base material with chemisorbed metal compounds is molded or cast into the desired final shape but before the chemisorbed metal compounds are converted to the desired size reduced metal particles. Because of the approximate monoatomic size of the metal particles as originally formed in this process, alignment during the reduction and sintering can be carried out at a lower temperature than is necessary with metal particles at their final size. To align randomly oriented metal particles formed by impregnation of base material requires higher temperatures (which might be above the Curie point, in which case no alignment is obtained) and usually also higher magnetic fields.

As indicated, a preferred product composed of magnetically aligned particles of a size just above the transition point for superparamagnetism is a magnetic material evincing a coercive force of not more than 20 oersteds, a remanence of at least 100 gauss and a $B_r/B_s$ ratio of at least 0.8, preferably over 0.9, and consisting essentially of ferromagnetic metal particles composed of at least 90% single domain particles disposed on an isolating solid material uniformly separating the metal particles.

Particularly useful for measuring the magnetic properties, such as demagnetizing factors, anisotropy, magnetization processes and magnetization saturation, and including the hysteresis loop of the magnetization curve, is the vibrating sample magnetometer described by S. Foner in "Rev. of Sci. Instruments," 30, pp. 548–557 (July 1959).

A more detailed description of the process and magnetic materials produced follows: the alumina or magnesia in the base material must have been substantially dehydrated prior to contacting with the aqueous solution of the transition group metal fluoride. Thus, the various aluminas and alumina-containing base materials, such as alumina per se and alumina-silica hydrogels, are not only first dried, but are also subjected to high temperatures in the range of at least 425° C. up to about 825° C. for a sufficient time to remove both physically held water and most of the chemically bound water, and to leave the surface substantially dehydrated, i.e., only slightly hydrated with chemically bound water, preferably to the extent of 3 to 10% based upon the weight of the $Al_2O_3$ content (plus $SiO_2$ content if present) of the base material. For example, boehmite (containing about 30% water) is dehydrated and converted to eta or gamma alumina. Ordinarily, about 2 to 5 hours at 400 to 450° C. in a dry atmosphere are sufficient for this purpose, with shorter times being used for the higher temperatures. Preferably, such aluminas and silica-aluminas will have a high surface area of at least 300 m.²/gram. Less desirable usually, although sometimes usable, are supports having a surface area of as low as 100 m.²/gram. The magnesia-containing base materials are substantially dehydrated in a similar fashion. Completely dehydrated aluminas and magnesia compositions are not suitable as base materials and usually have very low surface areas. Although various base materials containing or composed of substantially dehydrated magnesia, such as magnesia-silica, magnesia-silica-zirconia, and the like can be employed, the alumina-containing base materials are preferred for most purposes. Illustrative of siliceous alumina bases are synthetic silica-alumina, zeolites (e.g., synthetic chabazites), silica-alumina-zirconia and silica-alumina-magnesia which are known for use as hydrocarbon conversion catalysts per se or in the preparation of such catalyst. The alumina or magnesia base materials should contain at least about 1%, and preferably, at least 10% by weight of alumina or magnesia; more preferably, the base material should be substantially all alumina or magnesia.

In accordance with the method of the present invention, the above-described, substantially dehydrated alumina (or alumina-containing materials such as silica-alumina or the corresponding magnesia materials) is contacted for an appreciable time period with an aqueous solution of at least one fluoride of the ferromagnetic metals or mixtures giving ferromagnetic alloys. Useful in forming ferromagnetic metals or metal alloys are the fluorides of the metals differing from the first metal and modifying the magnetic properties, said metals being selected from those having atomic numbers from 23 through 30, as well as the second transition group, or lanthanides such as gadolinium and dysprosium. By "ferromagnetic" is meant a metal or alloy that has a permeability greater than 1.1. Especially suitable and preferred are the iron group metals of iron, cobalt and nickel and alloys generally containing at least 5% of an iron group metal, although in some instances, as in the ferromagnetic alloy of iron and palladium, 1% of the iron group metal can be employed. Usually, it is preferred to employ much more metal fluoride than will be contained in one pore volume (as calculated for the pore volume of the particular alumina or magnesia base being used and the amount of such base) of a saturated solution of the metal fluoride. Such preferred operation involves either using the appropriate volumes of the metal fluoride solutions or having in contact with the aqueous solution of metal fluoride a sufficient amount of solid metal fluoride to keep the solution saturated during the contacting period. Particularly with the metal fluorides of low solubility in water, it is preferable to employ an excess of solid metal fluoride over the amount which will saturate the water used. Usually, enough water is present so as not only to cover the volume of alumina-containing base material employed, but also to provide for agitation to aid the contacting and dissolving of the metal fluorides. If desired, the excess solid metal fluoride can be separated from the base material by means of a porous plate or filter. Enough metal fluoride should be present to give a metal content in the alumina-containing base material of at least 5% by weight, and preferably, at least 10%. Normally, the highest concentrations of transition group metal in the resulting product are the most desirable. Generally preferred are products containing 30 to 50% of the transition group metal. In some cases it may be desirable to repeat the steps of contacting the material with an aqueous solution of the desired metal fluoride after the product of first contacting has been dried and reduced.

Sometimes it is desirable to have a plurality of transition group metals present in the final product. (See, for example, the article by J. Friedel, Canadian Journal of Physics, 34, 1190–1211 (1956), describing various combinations suitable in metallic solid solutions.) It is a particular advantage of the present invention to prepare alloys having ferromagnetic properties, since the method provides a way of easily preparing the alloys in the desired ratio of components. Usually, the primary metal is selected from the iron group. Where it is desired to modify the magnetic properties of the primary metal, another transition group metal can be added, such as a minor proportion of a metal other than the iron group metal or sometimes an iron group metal other than the one selected as the primary metal. Where a plurality of metals are desired, they can be produced in the product by using an aqueous solution of a plurality of fluorides of the desired metals. Fluorides of the two or more selected transition group metals will become associated with the alumina-containing base during the contacting step. Alternately, but usually less desirably, a series of treatment with aqueous solutions of the metals can be used to apply each metal in serial order. Examples of suitable combinations of metals are cobalt plus iron, cobalt plus copper, cobalt plus chromium, cobalt plus nickel and nickel plus molybdenum.

The contact between the aqueous metal fluoride solution and the base material is continued until the base material has chemisorbed thereon at least 5%, on a dry weight basis, of metal fluoride. Normally, the contacting step is continued for several hours to allow the chemisorption reaction between the metal fluoride and the hydroxy groups in the base material to take place. Usually, the contacting is conducted at room temperature. Where the base material is composed of about 100 mesh particles as obtained by spray-drying, contacting for at least 3 to 4 hours, preferably overnight, (i.e., about 16 hours) at room temperature will be satisfactory. Longer times are allowed for obtaining the higher metal contents in the base material. Usually for metal contents above 30%, at least 2 days' contact at room temperature along with constant stirring is preferred, for example, with adequate agitation at room temperature, about 3 days' contact between a calcined silica-alumina of about 100 mesh particle size and a nickel fluoride solution maintained saturated, yielded a product containing about 40% nickel calculated as metal. By raising the temperature, such as to about 65 to 95° C., the contact time may be lessened. Usually it is preferred to continue the contacting until as indicated by the weight of metal fluoride adsorbed, most of the surface hydroxyl groups on the base material are reacted with metal fluoride. For example, with cobalt fluoride and eta alumina, most of the hydroxyl groups are reacted when 40–50% by weight of cobalt is chemisorbed. However, in many instances it is sufficient if at least 10% of the hydroxyl groups are reacted with the metal fluoride.

The alumina- or magnesia-containing base material is usually finely divided to a particle size below about 50 mesh as may be obtained by powdering the base material or spray-drying it. For some purposes, the base material preferably has a particle size below 100 microns. One suitable form of alumina is obtained as a fibrous alumina monohydrate in accordance with Patent No. 2,915,475; such alumina is said to have the boehmite crystal lattice and is made up of alumina fibrils which have a surface area of 250 to 350 m.²/gram and an average length of 50 to 700 millimicrons and an axial ratio greater than 20:1.

The treating solution is essentially only metal fluoride or a plurality of metal fluorides and water; materials such as ammonia or amines or other basic materials reactive with the support or metal fluorides are generally to be avoided. However, sometimes, particularly with the extremely divided fibrous alumina monohydrate, nonmetallic wetting agents or dispersants may be used. When ferrous fluoride is used, the pH is kept low, preferably below a pH of 3, to minimize formation of ferrous hydroxide gelatinous precipitates.

After contacting the alumina- or magnesia-containing base with the metal fluoride solution for a sufficient time, the excess solution is decanted from the treated base. Preferably, the treated base is then washed, as with water, to remove residual unreacted metal fluoride so that only the uniformly spaced, chemisorbed metal compounds are left for conversion to metal particles. The avoidance of the unreacted metal fluoride improves the uniformity of metal interparticle separation and particle size, which uniformity decreases the coercivity of the product and the switching time. The resultant metal fluoride-treated base is preferably first dried at relatively low temperatures of about 100–250° C. to avoid surface area loss. Preferably, the temperature during drying is kept as low as possible, particularly where the metal fluoride-treated base is exposed to the air during drying until substantially all (i.e., about 95% or more) of the water is removed. Towards the end of the drying period and as the temperatures are raised, oxygen is preferably excluded from contact with the metal fluoride-treated base, preferably by using a hydrogen atmosphere or other reducing gas. Thus, the drying step is carried out with care to avoid damage to the metal particles on the surface of the base. For example, the metal fluoride-treated alumina base can be treated for 10 hours at temperatures of about 150° C. in order to dry it adequately.

In the resulting dried material, the transition group metal component is finely dispersed on the surface of the alumina or magnesia base. Depending on the care exercised in the drying step, the metal oxy-compound particles appear to be close to monomolecular. Thereafter, the metal component is reduced such as by treatment in a reducing atmosphere of hydrogen at temperatures and times suitable to reduce the oxy-compounds of the transition group metal particles to the metal state and to partially sinter the metal to the desired size. Generally, the temperature is above 350° C., preferably above 400° C., but below the temperature at which the reduced metal particles appreciably combine chemically with the metal oxide base material. The shorter times are used with the higher temperatures. Usually, reducing the chemisorbed metal after drying requires at least one hour. Substantial completion of reduction is indicated by a sudden drop in water vapor content of the flowing hydrogen stream. Normally the temperature is adjusted to give the desired degree of sintering rather than extend the heating period beyond reasonable times, such as ten hours. For the larger particle diameters above 100 A., the minimum temperature for reduction in 1 day is about 500° C. Longer times can be used at lower temperatures, such as down to 350° C. for reducing. Where larger than 100 A. magnetic metal particles are wanted, generally higher temperatures are used to partially sinter along with the reduction. For example, a fine dispersion of cobalt on the surface of an alumina (i.e., 30 weight percent cobalt as metal on alumina) was partially sintered to particles having dimensions averaging 300 A. by heating for 2 hours at 700° C. and also by heating for 70 hours at 600° C. The effect of temperature on metal particle size is illustrated in the figure which is more fully discussed below.

When transition group metal particles on the surface of the base are desired to be below about 100 A., the reducing temperature is usually in the range of 350–700° C., preferably below 650° C. for reasonable periods of time, such as 1–5 hours, inversely related to the temperature. For example, an appreciable amount of magnetic particles is obtained by reducing a 30 weight percent cobalt on alumina for 2 hours at 350° C.; this is shown by moving a permanent magnet along the outside of the ampoule in which the sample is reduced and noting that some of the particles move along with the magnet. When metal particles in the range of 100 to 750 A. are desired, the heating is conducted usually at temperatures above 500° C. and preferably above 650° C. for reasonable periods of time, such as 1 to 10 hours. Generally, the maximum temperature of treatment is of the order of 850° C. depending on the nature of the transition group metal and the base material, as well as the time. Above such maximum temperature, undesirable chemical combination of the adsorbed metal and base material takes place to an appreciable extent. Instead of the above, the metal component can be reduced chemically as by treatment in a hydrogen or inert atmosphere with sodium borohydride or other chemical reducing agent, usually at non-sintering low temperatures, and then in the same atmosphere partially sintering the metal particles to the desired size.

The characteristics of the magnetic materials produced in accordance with the present invention are determined in part by the size of the transition group metal particles. Magnetic susceptibility measurements, for example, indicate that cobalt particles under 100 A. behave as extremely soft magnetic material as indicated by the low coercive force. Cobalt particles larger than 100 A. have higher coercive forces up to 600 gauss. As indicated above, the magnetic material resulting from the above process is characterized by single domain magnetic property. As the magnetic metal particles grow in size, particularly above 400 A., the proportion of multidomain particles increases. Measurements of the ferromagnetic nuclear resonance show that cobalt particles up to about 400 A. are substantially all single magnetic domain particles, particles of 750 A. behave as though about 10% of the cobalt is in multidomain particles. Particles of 800 A. average dimension are substantially all multidomain. For most purposes, the hard magnetic metal particles in the 400 to 750 A. size range can contain up to 15–20% multidomain particles. One of the highly desirable characteristics of the magnetic metal particles of less than 400 A. in size is that they are all single domain. The size of the transition group metal particles on the alumina or magnesia base can be determined and followed by X-ray diffraction methods. One such suitable method is that of Debeye-Scheerer which is described in X-ray Diffraction Procedures, by C. P. Klug and L. P. Alexander, Chapter 7 (1954), John Wiley, N.Y.

Another particular feature of the process is that the transition group metals dispersed on the surface of the alumina or magnesia base have a narrow distribution of particle sizes. Normally, the particle sizes do not vary more than about 20% from the average dimension in angstroms as determined by X-ray diffraction.

Multidomain ferromagnetic particles in the product can be detected by the nuclear resonance technique developed by A. M. Portis and A. C. Gossard described at J. Appl. Phy. 31, 2055 (1960), and Phys. Rev. Ltrs., 3, Y527 (1959). No external magnetic field is used in this technique. Rather, reliance is placed on the hyperfine field at the nucleus due to various magnetic fields arising from the electrons of the ferromagnetic atoms of the sample. The method is applicable to isotopes of the transition elements with odd mass number, and of these, the most abundant are $Fe^{57}$, $Co^{59}$ and $Ni^{61}$ (only odd mass number elements have an unpaired nuclear spin). For the measurement by the Portis and Gossard technique, a sample is placed in a tunable wave guide cavity of a very high frequency radio oscillator. Resonance is observed by loss in power of the oscillator when tuned to the nuclear resonance frequency of the sample. The signal is surprisingly large for multidomain particles; for example, a 30 weight percent cobalt on alumina as prepared in accordance with the present invention and with cobalt particles larger than 750 A. exhibits a resonance signal 130 times larger than background at 213 mc./s. The absence of resonance at 213 mc. indicates the absence of multidomain particles. Resonance at 217 to 218 mc. occurs when single domain particles are present. This resonance is external field dependent, shifting 1 mc. for each 1000 gauss of external field. This shift in frequency is due to the demagnetizing field of the single domain particles. Multidomain wall nuclei do not have a demagnetizing field. Multidomain resonance at 213 mc./sec. is not field dependent. The resonance frequency and line width are functions of the magnetic domain walls, particle size and presence of alloying elements.

As indicated above, the metal particles formed through chemisorption are uniformly spaced on the base material. Such uniform interparticle distance is advantageous, for example, in giving faster switching times. The resulting advantages stem from the influence of the interparticle distance on the magnetic field of the dispersed metal particles, as well as on the internal field when an external field is applied. The effect of interparticle distance can be calculated by assuming a spherical particle, for example, of cobalt, with a known magnetization is placed in a medium of permeability dependent upon the interparticle distance. From the particle permeability depending upon the known magnetization and anisotropic field of cobalt, one can calculate the permeability of the medium based upon the filling factor (i.e., the percent of metal in the medium). Changing the internal field causes a change in the nuclear resonance frequency of the single domain particle, which can be detected by ferromagnetic nuclear resonance measurements. Therefrom can be shown that resonance frequency decreases as the volume percent of the cobalt in single domain particles increases. Where at least 90% of the metal particles are single domain, the decrease in switching time due to domain wall effects is minimized. With increasing deviation from uniform particle distribution, the switching time becomes slower.

In the preparation of the magnetic materials in accordance with the present invention, shaping is carried out preferably after the steps of contacting the alumina or magnesia base with metal fluoride and subsequent drying but before reducing. In the shaping, the magnetic materials can be formed into pellets, beads, extruded or other particle shapes. Where desired, the material may be cast around lead-in wires having the desired spacing. Various die lubricants, such as a hydrogenated vegetable oil, polyvinyl alcohols, or the like nonmetallic materials can be used to aid in castiings and are burned out in the subsequent treatment or can be left in if they are inert.

Reduction in a magnetic field larger than the magnetic anisotropy energy of the metal (i.e., greater than 700 gauss for cobalt) results in a high degree of crystal axis orientation. The magnetic field applied may be of the order of 2000–3000 gauss during the reduction. Such orientation, as discussed above, is a desirable attribute for fast switching action in computer applications, in that such orientation contributes to square hysteresis loop characteristics which result in high signal-to-noise ratios. A narrow, square loop is necessary to generate a high flux in the output circuit with a low input or drive flux.

During the reduction in the magnetic field, the ferromagnetic metal compounds on the base material are reduced to metal, the atoms of which diffuse to cluster or sinter, building up on the surface of the base material metal particles with their preferred crystal axes (i.e., their easy axes of magnetization) aligned with the magnetic vector of the field. Magnetic core elements for computers formed with such aligned metal particles on the base material have the desirable attributes of square hysteresis loop, high remanence and fast switching speeds. Such magnetic switching devices are capable of switching times of the order of 50 nanoseconds, rather than the 1 microsecond switching speeds to which most present devices are limited.

After the magnetic particles are in their desired form and the reduced metal is in dried condition, they may be protected against oxidation by coating with suitable plastics such as polyesters, methacrylate, copolymers of polybutadiene with acrylonitrile, polyolefin and polyvinyl chloride alone or in copolymers with vinyl acetate. For some purposes, where the magnetic particles are carried on a finely divided or powdered base material, dispersions can be made in suitable dielectrics such as kerosene, desirably with the aid of dispersing agents.

After the magnetic particles are formed and have been reduced to metal, they can be disengaged and separated from the base material and dispersed in a solvent with the aid of high molecular weight polymeric materials to give dispersions having desirable characteristics and uses, such as in the formation of magnetic recording tapes and the like. Such procedure is especially advantageous when liquid dispersions of particles of alloys are desired, because the alloys are readily formed from mixtures of the fluorides of the metals without limitation. While it may be possible to form metal alloy particles by thermal decomposition of metal carbonyls, such route is limited to use of mixtures of metal carbonyls having close decomposition temperatures. In contrast to the thermal decomposition of metal carbonyls, the present procedure allows the preparation of alloys of two or more metals, irrespective of their melting points.

To illustrate the present invention, the following examples of preparations of magnetic materials are given.

*Example 1*

A calcined silica-alumina containing 25% alumina in spray-dried powdered form and having a pore volume of 0.89 cc./gram and a surface area of about 500 square meters per gram as measured by nitrogen isotherm was employed. 123 grams of such silica-alumina, together with 4 liters of distilled water and 99.92 grams of cobaltous fluoride was stirred for 11 hours at room temperature. The solid material was collected by filtering through a Büchner funnel and then dried for 3 hours at about 150° C. The dried product contained 25.4% Co and 9.8% F. Part of the dried product was reduced at 600° C. in hydrogen atmosphere for 1 hour; the cobalt in this first product (Sample A) had a particle size as determined by X-ray diffraction pattern of less than 50 A. The remainder of the undried product was stirred for 46 hours with distilled water and then filtered through a Büchner funnel and dried for 3 hours at 150° C. Part of this second product was reduced in hydrogen for 6 hours at 510° C. and then further treated in hydrogen for 1 hour at about 560° C.; the cobalt particles had an average size of less than 50 A. (Sample B.) Another part of the second product was reduced for 30 minutes at 760° C.; the cobalt particles averaged 450 A. in diameter (Sample C).

*Example 2*

A calcined alumina in spray-dried powder form and having a pore volume of 0.5 cc./gram and a surface area of 200 meters$^2$ per gram as measured by nitrogen isotherm was used. 123 grams of such alumina was mixed for 11 hours at room temperature with 4 liters of distilled water and 99.93 grams of cobaltous fluoride. Thereafter, the solids were separated from the liquid in a Büchner funnel and dried for 3 hours at 150° C. The dried product contained 24.0% Co and 9.8% F. Part of the dried product was treated in hydrogen atmosphere for 6 hours at 600° C.; in this material (Sample 2A) the particle size (as determined by X-ray diffraction pattern) of the cobalt was about 70 A. in diameter. The remainder of the dried product was mixed for 46 hours with distilled water, then filtered and dried for 3 hours at 150° C. Part of this second dried product was treated in hydrogen for 6 hours at 510° C.; X-ray diffraction pattern measurements on this material (Sample 2B) showed a particle size of less than 70 A. in diameter for the cobalt dispersion on the surface of the alumina. Separate parts of this material (Sample 2B) was further treated in hydrogen for various periods and the particle size determined. The additional hydrogen treatment and particle sizes of the cobalt with various products are given in the following table:

| Sample No. | Treatment in Hydrogen Atmosphere | | Particle Size of Reduced Metal, A. |
|---|---|---|---|
| | Time | Temp., °C. | |
| 2-C | 2 | 600 | <100 |
| 2-D | 2 | 650 | 550 |
| 2-E | 6 | 750 | 750 |

*Example 3*

A powdered, calcined alumina having a pore volume of 0.5 cc./gram and a surface area of 200 meters$^2$ per gram as measured by nitrogen isotherm was mixed in an amount of 123 grams for 72 hours at room temperature with a solution of 4 liters of distilled water and 99.93 grams of cobaltous fluoride. Then the solids were separated from the liquid by filtering through a Büchner funnel. After drying the solids for 3 hours at 150° C., the product contained 20.0% Co and 6.5% F. The dried product was reduced in a hydrogen atmosphere for 6 hours at 510° C. The reduced cobalt metal in the product had a particle size as determined by X-ray diffraction pattern of less than 50 A. in diameter. Separate portions of the reduced material were further treated in flowing streams of hydrogen for various periods and temperatures and the particle sizes of the resulting products determined as shown in the following table.

| Sample No. | Treatment in Hydrogen Atmosphere | | Approximate Average Particle Size of Reduced Metal, A. |
|---|---|---|---|
| | Time | Temp., °C. | |
| 3-A | 2 | 800 | 800 |
| 3-B | 2 | 850 | 1,200 |
| 3-C | 2 | 710 | 500 |
| 3-D | 100 | 600 | <100 |

The data obtained in this and the preceding example show that as the temperature in the reducing atmosphere is increased or the time of treatment is lengthened, the size of the magnetic particles is increased. X-ray diffraction showed the formation of a cobalt aluminate phase at the higher temperatures at which the added metal combines as a solid solution in the base material.

*Example 4*

A calcined alumina in spray-dried powdered form and having a pore volume of 0.5 cc./gram and a surface area of 200 meters$^2$ per gram was used in an amount of 123 grams and was mixed for about 100 hours with 4 liters of distilled water and 99.93 grams cobaltous fluoride. After filtering and drying the solid for 3 hours at 150° C., the product contained about 29.5% Co and 18.0% F. This illustrates that the longer contact period with agitation gives higher added metal contents.

*Example 5*

A material composed of cobalt-iron alloy magnetic particles supported on alumina was prepared as follows. Into 2.4 liters of distilled water was stirred 456 grams of $CoF_2 \cdot 4H_2O$ and 3 grams of the calcined alumina, used in Example 4; also sufficient iron fluoride was added to the aqueous solution to give the iron content indicated below. After 18 hours of stirring of the mixture, the sample of the treated alumina was removed and dried for 6 hours under a stream of hydrogen at about 170° C. The dried material contained 29.5% cobalt and 1.1% iron calculated as metal. The dried product after reducing in hydrogen will have cobalt-iron alloy particles of sizes dependent upon the conditions of reduction as indicated above, for example, by the results obtained in Example 2. With the appropriate metal particle size and reduction in a magnetic field, the product will exhibit a coercive force of less than 20 oersteds, a remanence of over 100 gauss, a $B_r/B_s$ ratio of over 0.9. The product will consist essentially of single domain cobalt-iron alloy particles uniformly separated and disposed on alumina as an isolating material and will show a rectangular hysteresis magnetization curve. Magnetic elements so formed can be used in computers as memory and logic elements with fast switching speeds at low drive.

*Example 6*

A series of magnetic alloy particles was formed in the calcined alumina used in Example 5 by the following procedure: 100 grams of the alumina, 152 grams of $CoF_2 \cdot 2H_2O$ and 2.48 grams of 3.36 grams of $CuF_2 \cdot 2H_2O$ and $NiF_2 \cdot 4H_2O$, respectively, were added to one liter of distilled water and stirred continuously for 24 hours, allowed to stand without stirring for 18 hours and then stirred continuously for 42 hours at room temperature. The treated aluminas were vacuum filtered and then dried for 5 hours at about 200° C.

The above preparations had the following analyses:

(1) 34.9% cobalt and 0.1% copper (calculated as metal)
(2) 23.5% cobalt and 0.25% nickel (calculated as metal).

When these preparations are predried and reduced in a hydrogen stream, particle sizes for the added alloy will be as described above depending upon the temperatures and times of reduction. Ferromagnetic resonance measurements on these samples show resonance peaks indicating the metal alloy.

*Example 7*

A magnetic alloy was formed by contacting 200 cc. of a calcined alumina in spray-dried powdered form (eta-alumina) and having a pore volume of 0.5 cc./gram and a surface area of about 200 square meters per gram as measured by nitrogen isotherm, with 32 grams of ferrous fluoride dihydrate plus 16 grams of cobaltous fluoride dihydrate in 1 liter of distilled water having a pH of 1 by the addition of sufficient hydrogen fluoride. The powdered alumina and aqueous solution were stirred for 24 hours and then the mixture was vacuum filtered and the solid dried at 300° F. for about 6 hours. The dried material had an iron content of 5.7% and a cobalt content of 3.6% by weight. The dried product was reduced in a stream of hydrogen for 2 hours at 710° C. The X-ray diffraction patterns were obtained and the spacing of the peaks compared with the known spacing for pure metals and alloys, as shown, for example, in W. B. Pearson's Handbook of Lattice Spacing and Structures of Metals and Alloys (Pergamon Press, 1958). Such measurements show that the reduced metal composition contained no free cobalt and gave a showing of an alloy of 65% iron and 35% cobalt.

*Example 8*

To 400 grams of Example 7 alumina which had been heated for 10 hours at 700° F. was added in 2 liters of water while stirring, 81 grams of cobaltous fluoride dihydrate and 303 grams of nickelous fluoride tetrahydrate. The product (Sample 8–1) contained 6.5% cobalt and 14.6% nickel. Similarly, to 400 grams of the same calcined alumina and 2 liters of water was added 84 grams of ferrous fluoride and 303 grams of nickelous fluoride at a pH of 3, giving a product (Sample 8–2) with 3.1% iron and 11.3% nickel. Also, starting with 400 grams of the above alumina and 2 liters of water and adding while stirring 167 grams of ferrous fluoride dihydrate at a pH of 3 and 162 grams of cobaltous fluoride dihydrate gave a product (Sample 8–3) with 9.5% iron and 11.1% cobalt. After drying the samples at 300° F. overnight, all were reduced in a stream of hydrogen for 2 hours, the temperature being at 710° C. in order to develop large enough particles to determine whether alloys were formed or not. X-ray diffraction measurements indicated that alloys were formed in each of the samples, Sample 8–2 having essentially all the iron group metals in a homogenous alloy, Sample 8–1 having a lesser proportion of alloy and Sample 8–3 having the least.

*Example 9*

For comparison, an attempt was made to prepare a magnetic alloy by impregnating alumina with metal nitrates instead of chemisorbing with metal fluorides. For this purpose 245 grams of cobaltous nitrate hexahydrate and 455 grams of ferrous nitrate hexahydrate were added to 1000 cc. of water. The resulting solution was used to impregnate for 1 hour 200 grams of the calcined alumina of Example 8. After draining off the excess solution, the impregnated alumina was dried at 800° F. for 2 hours. The impregnation and drying was repeated 4 times. Analysis of product gave 14.7% Fe and 9.7 Co. After reducing in hydrogen at 710° C. for 2 hours, X-ray diffraction analysis showed a strong peak for iron and a weak broad peak for cobalt, indicating that no appreciable amount of iron-cobalt alloy was formed.

In order to show the relationship between particle size and the degree of heat treatment in hydrogen, the data obtained in Example 3 are plotted in the accompanying graph. In making the X-ray diffraction pattern measurements for particle size, diffractions were obtained using the 111 reflection plane and the 200 reflection plane for each of the samples. The sizes for the particles were taken as the average derived from the measurements using the two reflections. For Sample 3–C, a molybdenum target was used in the X-ray instead of the standard copper target to avoid exciting X-ray fluorescence from the sample when using copper. The points plotted on the graph are taken from the several preparations as identified in the following tabulation.

| Sample No. | Temperature of Reduction, ° C. | Reducing Time, hrs. | Average Particle Diameter in A. |
|---|---|---|---|
| 3–D | 600 | 100 | 100 |
| 3–C | 710 | 2 | 500 |
| 3–A | 800 | 2 | 800 |
| 3–B | 850 | 2 | 1,200 |

The several preparations for which the data are plotted in the graph were examined for ferromagnetic nuclear resonance (Portis and Gossard method) in the 210–220 megacycle range where a strong signal occurs at 213 mc./sec. when magnetic domain walls exist inside a metal particle and a weak signal occurs at 217 mc./sec. for single domain particles. Essentially no multidomain particles were observed in the sample with 400 A. average dimension for the metal particles, but a strong multidomain signal was obtained in samples with average particle size of 800 A. The sensitivity of the ferromagnetic resonance is such that 1 milligram of multidomain cobalt gives twice the signal of the noise background. With samples containing 1 gram of cobalt, 1/10 of 1% of cobalt present as multidomain wall particles could be detected.

*Example 10*

Two samples on the calcined alumina of Example 8 were prepared for ferromagnetic nuclear resonance measurements: Sample 10–1 was prepared by chemisorbing cobaltous fluoride, in accordance with the method of the present invention, and contained 10% Co and 3.6% F. Sample 10–2 was prepared by impregnation with cobaltous nitrate and contained 5% Co. Both samples were reduced in hydrogen for 2 hours at 710° C. and then sealed under vacuum in a quartz tube. Ferromagnetic nuclear resonance measurements showed marked differences in the samples. Sample 10–1 had an asymetric resonance centered at 216.6 megacycles and the impregnated Sample 11–2 had a broad asymetric resonance centered at 213.8 megacycles. The half width of resonance for Sample 10–1 was 1.8 megacycles and for Sample 10–2 was 4.2 megacycles.

These results indicate that the chemisorption method produces a uniform distribution of metal particles of approximately the same size over the alumina surface. On the other hand, the impregnation method results in a clustering of cobalt particles with an apparent concentration of 60–80% of the cobalt in clusters. The lack of uniform distribution of metal particles by the impregnation technique results from a clustering, probably at the bottom of the alumina pores, leaving large areas of alumina surface with no metal particles.

*Example 11*

A series of magnetic metal particles was formed using the calcined alumina of Example 8 by the following procedure: for each sample, 200 cc. of the alumina and 1 liter of water were used as the starting materials. With the exception noted below, each sample was prepared by adjusting with HF the pH of the water to 3, adding the specified amount of metal fluorides, stirring for 48 hours at room temperature, vacuum filtering, drying at 300° F. for about 6 hours, and then measuring the metal contents. For Sample 11–1, 96 grams of ferrous fluoride dihydrate and 48 grams of cobaltous fluoride dihydrate were added, the product analyzing as 17.5% iron and 9.1% cobalt. For Sample 11–2, 167 grams of ferrous fluoride dihydrate were added, the resulting product containing 19.3% Fe. For Sample 11–3, 84 grams of ferrous fluoride dihydrate and 104 grams of nickelous fluoride tetrahydrate were added, the product containing 11.1% Ni and 8.06% Fe. For Sample 11–4, 30 grams of ferrous fluoride dihydrate, 163 grams of nickelous fluoride tetrahydrate, 7.1 grams of cupric fluoride dihydrate, 4.8 grams of chromic fluoride tetrahydrate were added, the product showing 3.6% Fe, 16.3% Ni, 4.9% Co and 0.4% Cr. For Sample 11–5, 137 grams of ferrous fluoride dihydrate and 43 grams of nickelous fluoride tetrahydrate were added, the product showing 4.6% Ni and 14.8% Fe.

Each of the above samples was reduced in a stream of hydrogen for 4 hours at 450° C. Thereafter, the switching times were measured using a 20 oersted driving force. The switching times in nanoseconds (i.e., millimicroseconds) were as follows:

| Sample No.: | Switching times (nanoseconds) |
|---|---|
| 11–3 | 80 |
| 11–4 | 65 |
| 11–5 | 90 |

As indicated above, the magnetic particles prepared in accordance with the present invention may be used in various ways. For example, the dried product obtained by chemisorbing suitable magnetic metals on finely divided powdered alumina- or magnesia-containing base materials can be molded into rod-shaped bodies of small cross-sectional area and reduced as described above. Thereafter, the rods can be mixed with a plastic binder and molded in a rod-aligning magnetic field, as described in Patent 3,024,392. In addition, memory and logic units in computers are a desirable use of the products of the present invention. Such units formed in accordance with the present invention should be easier and less expensive to make than memory units made with very thin films which are difficult to form (e.g., because of the contamination and holes formed in the film) and which are delicate to wire and to make uniform. Prior art thin film-type cores need a bias field to prevent fanning of the magnetic vector as described in Patent 3,023,402. Also, such thin film cores are subject to eddy current problems at high frequencies. Further, a number of such cores are assembled in one array and one bad core spoils the whole array. On the other hand, because of the very small particles, their isolation and other characteristics, magnetic cores of the present invention avoid these problems of thin film-type cores: the bias field is not needed; the cores are easily formed and readily tested before incorporation in an array; and the cores can be used at high frequencies without the eddy current problem. The present magnetic cores or elements can be used to advantage in magnetic core shift register circuits as in Patent 3,013,252 and in many other systems such as, for example, those shown in Patents 3,014,204; 3,018,961; 3,019,418; 3,019,419; 3,021,510; 3,021,511; 3,041,466 and 3,045,228.

Also, for use in memory and logic systems, superparamagnetic and ferromagnetic metal particles can be formed on the surface of a nonconducting support such as glass in the following manner. Discrete spots of substantially dehydrated alumina are first formed on the surface of the nonconducting support such as glass, polyethylene sheets, "Mylar" polyester, and the like. The discrete spots may be suitably formed in various ways, such as by a silk screen printing with suitable aqueous or organo sols of alumina (see various preparations disclosed in U.S. Patent 2,915,475; e.g., Examples 5, 7 and 22). After printing the spots of the alumina sol on the glass surface, the solvent is flashed off by heating to leave substantially dehydrated alumina spots on the surface of the glass. Thin films of alumina in such spots are usually preferred, although not essential for fast switching with the reduced magnetic metal subsequently added which have particle sizes below 100 A. Thereafter, the nonconducting support with the spots of alumina on it is suspended in aqueous solution of the selected transition group metal fluoride for a sufficient period of time to chemisorb on said alumina spots at least 10%, and preferably at least 25% by weight (based on said alumina) of the transitional group metal. Thereafter, the treated glass is removed from the aqueous solution and carefully dried as described above. Then the chemisorbed metal is reduced in a hydrogen atmosphere at temperatures between 400 and 700° C. for times to give reduced metal particles of below 100 A. in diameter. Reduction in a magnetic field larger than the anisotropy field, i.e., above 700 gauss of for cobalt, gives crystal axis alignment. Preferably higher strength fields, such as from 2000–3000 gauss up to 30,000–50,000 gauss are used where complete alignment of all particles is important. When cobaltous fluoride is used, the cobalt on the surface of the alumina spots has a cubic crystal form (superior to the hexagonal form), a low coercive force and high remanence (when reduced in magnetic field) and also has superparamagnetic properties. The cobalt on the alumina deposits can be connected by known methods, such as multilayer printed wiring on a plastic material. In a similar manner, other metals such as iron and nickel or alloys such Fe-Ni, Co-Fe, Ni-Co, Fe-Ni-Co-Cr, and the like can be formed on small deposits of alumina or magnesia.

Illustrative of the foregoing procedure, a component for conversion to a memory core unit can be prepared by silk screen printing onto a clean glass plate (2 x 3 inches) spots of alumina from an aqueous sol of fibrous alumina monohydrate as described in Example 22 of U.S. Patent 2,915,475. The printing and subsequent treatment is such as to give substantially dehydrated high surface alumina in spots of about 50 mils in diameter spaced about 50 mils apart in a regular pattern on the glass plate. After printing, the alumina is dried and then substantially dehydrated to an activated alumina form heretofore. Then the plate is suspended in an aqueous solution of cobaltous fluorides for about 48 hours with agitation of the solution. Under such conditions the alumina will chemisorb cobaltous fluoride to an extent that after subsequent drying and reduction, the alumina spots will acquire a cobalt content of about 40%. After the contacting period, the plate is removed from the solution and dried carefully at about 100° C. for 3 hours. Then the glass plate is placed in an oven or container with an atmosphere of flowing hydrogen. The temperature is kept at about 600° C. for 3 hours to cause reduction of the chemisorbed cobalt to metallic cubic crystal form on the surface of the alumina. Under these conditions, the cobalt will be in particles of 50–100 A. in diameter and will exhibit square hysteresis loop magnetic conductance, i.e., a low coercive force and super-paramagnetic properties such that extremely fast switching is possible, whereby the final memory core units wired from the above product will have greatly reduced access time. Similarly, extremely fine particles of other metals such as iron, nickel or alloys such as Co-Fe, Co-Cu, Ni-Co, Ni-Mo and others can be formed on alumina spots on a non-conducting support, which product will find use in memory core units and the like.

Many other applications of the process and product of the present invention will readily suggest themselves to those skilled in the art. For example, magnetic material having magnetic metal particles of less than 100 A. in diameter, as obtained in accordance with the present invention, can be used for cores for transformers where rapid relaxation of strong magnetism is desired. For such purposes the higher concentrations of above 25% added metal on the base material are preferred in order to obtain a high density for the magnetic material.

Magnetically hard particles with high coercive force and remanence as made in accordance with the present invention can be used to form permanent magnets of various shapes dispersed on tape for magnetic tape recording, or arranged on drums or discs for memory devices. In making such materials, the tape, for example, can be prepared by using fine alumina powders containing suitable sized magnetic metal particles (which are prepared by the above-described chemisorption, for example, of cobaltous fluoride, on the powdered alumina, drying and reducing). Such magnetic metal containing alumina powders can be dispersed and bonded with a high molecular weight single resin polymer which can be plasticized and modified with a suitable rubbery butadiene-acrylonitrile polymer. Where the support is highly heat resistant, it can be coated with the fine calcined alumina powder and then converted to a magnetic particle coating by the present process.

When extremely fine particles of metal alloys are desired, such as for use in the manufacture of magnetic recording tapes or the like, the procedure of the present invention has certain advantages over other methods of obtaining such fine alloy particles. Among these advantages are the ease of forming the alloys in fine particles and the avoidance of the limitation to certain metals as is inherent in any process depending upon thermal decomposition of compounds such as metal carbonyl. As indicated above, the alloy may be formed on a suitable base material such as substantially dehydrated alumina or magnesia by contacting the base material under chemisorption conditions with mixtures of the fluorides of the desired metals. Suitable metal combinations include, for example, iron plus cobalt and nickel plus cobalt in various proportions and these metals plus various additions of tin, antimony, chromium, manganese, zinc, molybdenum and copper. Particles of iron-cobalt alloy (e.g., 70% iron plus 30% cobalt), Permalloy (22% Fe, 78% Ni), Mo Permalloy (Permalloy plus 2% Mo), and more complex combinations such as 20% Fe, 74% Ni, 5% Cu and 1% Mn (i.e., Mumetal) are examples. After the chemisorption of the metal fluorides on the base material, e.g., alumina, and reduction (with or without an applied magnetic field) under the above-described conditions, preferably such that the particles are asymetrical in shape by reducing in a high magnetic field to get high shape coercivity, the particles are disengaged from the base material such as by removing the base material by caustic leaching or by extraction with a chelating solvent. The alloy particles are suspended in solution by use of a dispersant and subsequently applied in a polymeric matrix to a magnetic tape backing, such as described in U.S.

Patents 2,699,408 and 3,023,123. The procedure will give several advantages, including excellent control of the particle size and minimize particle size range and uniformity of the easy axes of magnetization in the major axis of the asymetric particles. The resulting fine alloy particles in magnetic recording tapes will have superior fidelity and narrow coercive force distribution. Unusually high density can be achieved in magnetic tapes so that the tapes will have a high dynamic range. Also, such tapes will have high saturation output, good high frequency response, desirable print out characteristics and high signal-to-noise ratio.

Chelating solvents which can be selected for use in the above procedure, depending upon the nature of the base material, are, for example, ethylenediamine tetraacetic acid, sodium salt (EDTA), N-2-hyrodxyethyl ethylenediamine triacetic acid (EDTA-OH), acetyl acetone, aspartic acid, glutamic acid, trytophan, valine, phenylalanine, alpha-alanine, beta-alanine and aspargine. Especially suitable are the polycarboxylic amino acids such as EDTA. The chelating agent should be inert to the metal alloy particles and the detergent polymer selected.

Multiple extraction with the chelating solvents is carried out most conveniently in a Soxhlet extractor containing a quantity of a detergent polymer sufficient to disperse the metal particles and to prevent coagulation of the freed metal particles. The polymer preferably is in the form of a gel which acts to encase and collect the metal particles as they are freed from the support. With the metal particles becoming imbedded in such a polymer matrix, the tendency of the particles to agglomerate and to pyrolytically sinter, by exposure to air, is minimized.

Suitable polymer detergents or dispersants include high molecular weight (i.e., at least 10,000) organic polymers, inert to the metal (i.e., free of strongly acidic groups) and preferably consisting predominantly of carbon and hydrogen and containing oxygen or nitrogen, such as, for example, polystyrene having a molecular weight of 50,000, polymethylmethacrylate having a molecular weight of 100,000, methylmethacrylatepolyethylene glycol methacrylate copolymers having a mol ratio of 100:1, methyl methacrylate vinyl pyrrolidone copolymers having mol ratios of 10:1 and 40:1, and copolymers of dodecylmethacrylate, vinyl pyrrolidine commercially known as Acryloid 917 (a product of Rohm and Haas), poly(vinyl acetate), poly-(vinyl alcohol), poly-(vinyl pyrrolidone), polyacrylonitrile and copolymers of vinyl ethyl ether and vinyl pyrrolidone.

To facilitate handling, the detergent-metal particle dispersion can be diluted with an inert liquid such as unreactive hydrocarbons (e.g., benzene and toluene), ethers, esters and ketones. Generally, the liquid, like the polymeric detergent, must be unreactive with the metal particles, i.e., incapable of oxidizing the metal, and hence, should be essentially nonionizing (i.e., having an acid dissociation constant of less than $10^{-20}$). Usually, 0.01 to about 10% of the detergent polymers in the inert liquid is sufficient to disperse the metal particle. Suitable dispersions will contain 1–95% of the metal particles and 5–99% of the polymer plus inert liquid.

The dispersions so formed are suitable for coating magnetic recording carriers such as tapes, drums or discs and will give uniform magnetic films of the extremely fine metal alloy particles with superior properties. The dispersions can be applied, for example, to magnetic tape bases such as cellulose acetate and polyester backings, e.g., Mylar, and bound to the surface and coated with suitable resin-forming materials or binders, such as cross-linking polymers like Saran. Preferably, the dispersant selected is a partially polymerized material which can be used to form the binder in the finished product.

*Example 12*

A product containing 24% Co and 9.8% F on a calcined alumina prepared and reduced in essentially the same manner as Sample 2–C in Example 2 above was placed in a heavy grade Soxhlet filter cup. Also placed in the cup was an equal volume of an organic detergent polymer (i.e., a copolymer of ethylmethacrylate, methylmethacrylate and N-vinyl pyrrolidone having a mol ratio of about 5 to 1 of the methacrylates to the pyrrolidone and having a molecular weight of about 550,000) dissolved in toluene to a concentration of about 2.2%. The reflux boiler of the Soxhlet apparatus was filled with acetyl acetone. The extraction with the acetyl acetone was continued until alumina pellets in a duplicate Soxhlet apparatus were caused to disappear by acetyl acetone extraction, a matter of about 6 days. An electron microscope examination of the cobalt particles dispersed in the jelly-like mass of the organic detergent polymer indicated that the metal particles were mainly spherical and had a particle size of about 150 A.; very little clumping of the particles was noted in the analysis. Such a cobalt dispersion in the organic polymer upon dilution with an inert solvent such as toluene is suitable for application with a binder to a magnetic tape backing.

I claim:

1. A method of preparing magnetic material of controlled particle size on a base material composed of at least 1 metal oxide selected from the class consisting of alumina and magnesia which comprises contacting said metal oxide base material in a substantially dehydrated state with an aqueous solution of at least one fluoride of a transition group ferromagnetic metal to chemisorb at least 5% of said metal as chemisorbed metal compounds on said base material, the amount of said metal fluoride being at least 5% of said base material on a dry weight basis and the contacting time being at least 3 hours when the contacting temperature is room temperature, thereafter drying and subjecting the chemisorbed metal compound on said base material for at least 1 hour to reducing conditions in a reducing atmosphere to convert the chemisorbed metal compounds to a reduced metal state and heating for at least 1 hour at 350° C. to 850° C. but below that temperature at which said reduced metal particles combine chemically with said metal oxide base material, to sinter the reduced metal to particles of 10 to 800 A. in size.

2. A method of preparing magnetic material of controlled particle size on a base material containing at least one metal oxide selected from the class consisting of alumina and magnesia, which method comprises contacting said metal oxide base material in a substantially dehydrated state and having a relatively high surface area with an aqueous solution of a fluoride of a ferromagnetic transition group metal to form at least 5%, on a dry weight basis, of chemisorbed metal compounds on said base material, the amount of said metal fluoride being at least 5% on a dry weight basis of said base material and the contacting time being at least 3 hours when the contacting temperature is room temperature, drying the said fluoride-treated metal oxide base material at relatively low temperatures and heating the resultant dried material at least 1 hour in a reducing atmosphere at a temperature in the range of 350 to 850° C. but below the temperature at which the reduced metal chemically combines with the metal oxide base material, to sinter the reduced metal to particles of 10 to 800 A. in size.

3. The process of claim 2 wherein the heating step is carried out at conditions of temperatures within the range of 350 to 700° C. and times to give reduced metal particles of up to 100 A. in average dimension, whereby the resultant material has a low coercive force.

4. The process of claim 3 wherein the heating for reduction is carried out in the presence of an external magnetic field whereby the resulting magnetic particles exhibit high remanence.

5. The process of claim 2 wherein the heating is carried out at temperatures above 500° C. for sufficient time to reduce chemisorbed compounds of the added metal and to sinter such metal particles to 100 to 400 A. in average dimension, whereby the resultant magnetic material has a high coercive force and remanence.

6. The process of claim 2 wherein the aqueous solution contains a fluoride of an iron transition group metal and also contains a fluoride of a different metal modifying the magnetic properties of the iron group metal selected and having an atomic number in the range of 23 to 30.

7. A method of producing a ferromagnetic material having a high remanence and a rectangular hysteresis loop comprising the steps of:

(a) chemisorbing a fluoride of a ferromagnetic metal from an aqueous solution on a solid electrically nonconductive and nonmagnetic substrate having a high surface area and uniformly spaced reactive hydroxyl groups on said surface, said substrate being composed of a substantially dehydrated metal oxide selected from the class consisting of alumina and magnesia, thereby forming in said chemisorption by reaction of said metal fluoride with said hydroxyl groups a metal compound at the sites of said hydroxyl groups on the surface of said solid substrate, the amount of said metal fluoride being at least 5% on a dry weight basis of said substrate;

(b) subjecting said chemisorbed metal compound to reducing conditions in a reducing atmosphere for at least 1 hour to convert said metal compound to particles of metal dispersed on the surface of said solid substrate; and (c) in a magnetic field, sintering said monoatomic metal particles into single domain magnetic particles with their crystal axes uniformly aligned, said particles having an average dimension of less than 400 A., said sintering being by heating for at least 1 hour at 350 to 850° C. but below the temperature at which said metal particles chemically combine with said metal oxide substrate.

8. A method of producing a magnetic switching element having a coercive force of less than 20 oersteds and a remanence of at least 100 gauss comprising the steps of:

(a) chemisorbing a fluoride of a ferromagnetic metal from an aqueous solution on a solid electrically nonconductive and nonmagnetic substrate having a high surface area and uniformly spaced reactive hydroxyl groups on said surface, said substrate being composed of a substantially dehydrated, finely divided metal oxide selected from the class consisting of alumina and magnesia, thereby forming in said chemisorption by reaction of said metal fluoride with said hydroxyl groups a metal compound at the sites of said hydroxyl groups on the surface of said solid substrate, the amount of said metal fluoride being at least 5% on a dry weight basis of said substrate;

(b) at least partially drying the treated substrate at a relatively low temperature in a reducing atmosphere;

(c) molding into desired shapes the resultant partially dried particles of treated substrate;

(d) subjecting said chemisorbed metal compound to reducing conditions in a reducing atmosphere for at least 1 hour to convert said metal compound to metal particles on the surface of said solid substrate; and (e) in a magnetic field, sintering said monoatomic metal into particles having an average dimension of less than 100 A. and a relaxation time greater than the switch timing pulse, said sintering being by heating at 350 to 750° C. for 1 to 5 hours inversely related to said temperature.

9. Process of claim 8 wherein the partially dried particles are molded into small, flat discs suitable for use as switching elements.

10. A method of forming paramagnetic particles on a surface of a nonconducting support which comprises forming on said surface discrete spots of substantially dehydrated alumina, contacting said spots of alumina with an aqueous solution of a ferromagnetic iron transition group metal fluoride to chemisorb said fluoride on said alumina, the amount of said metal fluoride being at least 10% by weight based on said alumina, said contacting time being at least 3 hours when the contacting temperature is room temperature, drying said treated alumina at a temperature below 250° C., and heating said chemisorbed metal compound in a reducing atmosphere at temperatures between 400 and 700° C. for 1 to 5 hours inversely related to said temperature to sinter said reduced iron group metal particles of 10 to 100 A. in average dimension, whereby the resultant iron group metal is in the form of single magnetic domains with a low coercive force.

11. A method of forming magnetic particles on the surface of a nonconducting support, which comprises depositing on said support discrete spots of substantially dehydrated alumina, contacting said spots of alumina with an aqueous solution of cobaltous fluoride to chemisorb said fluoride on said alumina, the amount of said cobaltous fluoride being at least 10% by weight of alumina, the contacting time being at least 3 hours when the contacting temperature is room temperature, drying said cobalt-alumina at a temperature below 250° C. and reducing said cobalt in a reducing atmosphere at temperatures between 400 and 700° C. 1 to 5 hours inversely related to said temperature to sinter the reduced cobalt metal particles of 10 to 100 A. in average dimension, whereby the resultant cubic cobalt particles exhibit a low coercive force and remanence.

12. An improved magnetic material having a high remanence and rectangular hysteresis cycle of the technical magnetization curve, such that the flux changes rapidly as the core switches between opposite polarity states of saturation, said material consisting essentially of high surface area alumina and at least 5% by weight of magnetically aligned, single domain ferromagnetic metal particles of 10 to 100 A. in average dimension dispersed and separated from each other on the surface of said alumina.

13. An improved magnetic material consisting essentially of high surface area metal oxide selected from the group consisting of alumina and magnesia and dispersed on the surface of said metal oxide at least 10% by weight of magnetically aligned, single domain, ferromagnetic metal as discrete particles of 10 to 400 A. in average diameter.

14. The process of forming stable dispersions of fine metal alloy particles which comprises bringing a substantially dehydrated metal oxide base material containing 3 to 10% by weight of combined water and selected from the group consisting of alumina and magnesia into contact with an aqueous solution of a mixture of fluorides of metals, the alloy of which is ferromagnetic with a permeability of greater than 1.1, the amount of metal fluorides being at least 5% by weight on a dry basis of said base material, continuing said contact for at least 3 hours at room temperature until at least 5% on a dry weight basis of said metal fluorides are chemisorbed on said base material, drying and reducing the chemisorbed metal fluorides on the base material to convert the metal fluorides to an alloy of the metals in a reduced state, heating for at least 1 hour in the range of 350° C. to 850° C. to sinter the reduced metal to particles having a size of 10 to 800 A., and separating said metal alloy particles from said base material in the presence of a high molecular weight organic polymer dispersant in sufficient amounts to collect the metal alloy particles as they are freed from the base material and to prevent them from coagulating.

15. The process of claim 14 wherein the collection of the freed metal alloy particles in the polymer is admixed with an inert liquid, a sufficient amount of polymer being maintained to suspend the metal particles in said inert liquid.

16. The process of claim 14 wherein the drying and reducing are carried out in a magnetic field above the magnetic anisotropy energy of the metal to produce metal alloy particles having a high shape coercivity.

References Cited by the Examiner
UNITED STATES PATENTS

| | | | |
|---|---|---|---|
| 2,574,480 | 11/51 | Hillyer et al. | 252—441 |
| 2,744,147 | 5/56 | Milks | 252—441 |
| 2,853,398 | 9/58 | Mackiw et al. | 117—100 |
| 2,982,793 | 5/61 | Turner et al. | 252—466 |
| 3,042,543 | 7/62 | Schuele | 252—62.5 |
| 3,140,925 | 7/64 | Lindquist et al. | 252—441 |

MAURICE A. BRINDISI, *Primary Examiner.*